United States Patent Office 3,539,469
Patented Nov. 10, 1970

3,539,469
METHOD OF MANUFACTURING A SILVER CATALYST FOR FUEL CELLS BY IMMERSION COATING
James E. Schroeder and Dirk Pouli, Milwaukee, Wis., assignors to Allis-Chalmers Manufacturing Company, Milwaukee, Wis.
No Drawing. Filed Dec. 26, 1967, Ser. No. 693,179
Int. Cl. B01j *11/20;* C23c *3/00;* H01m *27/04*
U.S. Cl. 252—474                                8 Claims

ABSTRACT OF THE DISCLOSURE

A fuel cell cathode catalyst comprising a nickel powder, the particles of which are coated with silver. The catalyst is produced by immersing a quantity of nickel powder into a dilute acid solution to activate the surface of the powder. A silver salt solution is then added to the acid solution causing metallic silver to replace surface nickel going into solution. The silver coated nickel powder is subsequently washed and heat treated at from 250 to 500° C. in a nonoxidizing atmosphere.

BACKGROUND OF THE INVENTION

This invention relates generally to catalysts for electrochemical cells, especially those electrochemical cells known as fuel cells. More specifically, this invention relates to a new and improved low cost silver catalyst and methods for manufacturing the catalyst.

The term fuel cell, as used herein, refers to those electrochemical devices that convert the free energy of a chemical reaction directly to electrical energy. Such devices are well known in the art and although there are differences between various cells, a discussion of some of their common characteristics will aid in the understanding of my invention.

As is known, oxidation-reduction reactions are accompanied by the transfer of electrons from the reductant to the oxidant. In individual fuel cells, the oxidation reaction and reduction reaction take place at spacially separated electrodes. At each electrode, there occurs what is called a half-cell reaction. One electrode, called the anode, is the site of the oxidation half-cell reaction. A reactant, referred to as the fuel, that is oxidizable with respect to some oxidant is supplied by suitable means to the anode, and is thereat electrochemically oxidized. Oxidation of the fuel releases electrons to the anode. At the other electrode, called the cathode, spaced apart from the anode by a suitable electrolyte, the other half-cell reaction simultaneously takes place. A reactant called the oxidant, reducible with respect to the fuel, is supplied by suitable means to the cathode, and is thereat electrochemically reduced. This reaction takes up electrons from the cathode.

These two half-cell reactions result in the cathode tending to have a deficiency of electrons and the anode to have an excess. This tendency is relieved by the transfer of charge electronically through an external circuit connecting the electrodes, accompanied by the ionic transfer of charge through electrolyte. The current produced in the external circuit can do useful work. Production of current will continue so long as fuel and oxidant are supplied and waste products exhausted.

The voltage of the individual fuel cell is limited by the theoretical free energy change ($\Delta F$) for the reaction at the fuel cell operating temperature. The amperage of the cell is determined by the rate of reaction and the size of the cell. In practice, several individual fuel cells are coupled in cooperative electrical connection to obtain the desired output. A plurality of cells so connected is known as a module.

The catalyst of this invention is particularly suitable in those fuel cells having oxygen or air oxidant supplied to the electrode surface remote from the electrolyte. The oxidant differs through the porous electrode until it meets the electrolyte at a three phase boundary of electrode, oxidant, and electrolyte.

In order for the oxygen to react at this boundary, it must first become activated. Activation of the oxygen is especially important because it is believed that the rate of activation of oxygen at the cathode is the rate limiting reaction in a fuel cell. Activation has been achieved by heat, pressure and for low temperature reaction, by catalysts. Silver, as an oxygen activation catalyst, has been known and heretofore used. The amount of the catalyst's surface area exposed to the fuel cell reactants, however, in part limits the reaction rate. If the surface area of the silver is increased, some increase in reaction rate results. It is not surprising therefore that research efforts have succeeded in developing methods for producing high surface area silver powders which, when fabricated into fuel cell electrodes, will give extraordinary high outputs. These high surface area silver powders have not only been successfully used as fuel cell cathode catalysts, but have also been successfully incorporated as catalysts in other electrochemical devices. These silver powders do, however, suffer one disadvantage in that they are rather expensive. The processes for producing these powders is time consuming and costly, and of course this is compounded by the fact that the silver itself is rather expensive.

SUMMARY OF THE INVENTION

This invention is predicated upon our discovery and development of a method for producing a high surface area silver coated nickel powder. As a catalyst, this silver coated powder is every bit as effective as the best known high surface area silver powder. Yet, this coated powder is more advantageous commercially because the process for its manufacture is quick, simple and inexpensive, and of course, a much lesser quantity of silver is utilized.

Accordingly, it is a primary object of this invention to provide a new and relatively inexpensive high surface area silver catalyst for application in fuel cells and other electrochemical devices.

It is another primary object of this invention to provide a new high surface area conductive powder of nickel or the like having a silver coating.

It is a further primary object of this invention to provide a quick and inexpensive process for producing a high surface area nickel powder coated with silver.

These and other objects and advantages are fulfilled by this invention as will become apparent from an understanding of the following detailed description.

DESCRIPTION OF THE PREFERRED EMBODIMENTS

Broadly, the above silver coated nickel catalyst is produced by the chemical replacement of acid activated surface nickel with silver. This is effected by first etching the powder in an acid solution to activate the surface thereof, and thereafter adding a silver salt solution to the mixture of powder and acid. In a replacement reaction, the silver is very quickly deposited onto the surface of the powder particles. After deposition, the coated powder is washed and then is preferably heat treated in a nonoxidizing atmosphere to enhance the catalytic characteristics of the coated powder. The coated powder produced by this method will have a surface area roughly 10 times greater than the surface area of the substrate powder.

The starting powder or substrate powder upon which the silver is deposited serves merely as a collector base to receive the catalytic coating. Therefore, its chemical composition is not too critical. However, since the powder will comprise the main body of any electrode manufactured therefrom, the substrate powder should be conductive and reasonably stable in the environment to which it may be subjected. For alkaline fuel cell applications, the substrate powder is preferably any nickel powder having at least a moderately high surface area, such as carbonyl nickel, Raney nickel or one of the other more recently developed high surface area nickel powders. The most ideal powders are those having a particle size of 3 to 5 microns and a surface area of about 0.5 m.$^2$/gm. Although the process itself will work equally well on lower or higher surface area powders, the resulting surface area of the coated powder is optimized on starting substrate powders of about 0.5 m.$^2$/gm. Hence, if the surface area of the resulting silver catalyst is of no concern, then the surface area of the substrate powder is of no concern. The substrate powder is preferably nickel only because nickel is quite stable in fuel cell environments. Therefore, it is obvious that other stable conductive powders, such as powders of cobalt, iron or the like would suffice in a more limited extent. However, in order for the replacement reaction to proceed, the substrate powder must be of a metal less noble than silver as determined by the conventional electromotive series.

In the practice of this invention, the properly selected substrate powder, such as a nickel powder, is first etched, preferably in a dilute acid solution, to activate the surfaces of the powder particles. The acid solution and other etch parameters should be sufficient to dissolve all oxides and other surface impurities. This usually results in dissolving at least about one percent of the substrate powder. Therefore, the concentration of the acid solution, at given etch parameters such as temperature and duration, etc., should be strong enough to dissolve at least one percent of the powder. It should be obvious that there is no critical upper limit to the amount of powder that may be dissolved. For obvious economic reasons however, excessive amounts of powder dissolution should be avoided. Although we have preferred to use the common reagent type acids, such as sulfuric acid, nitric acid, and phosphoric acid at ambient temperatures and at concentrations sufficient to yield a pH of from 0 to 3, obviously other concentrations and other acids would suffice if temperature and/or duration were adjusted accordingly. Nevertheless, highly concentrated strong acids should be avoided lest too much nickel powder be dissolved. Although other acids may be used if strong enough to dissolve a portion of the substrate powder, it should be noted that the acid should, of course, be one in which silver ions can exist. Therefore, hydrochloric acid cannot be used as silver chloride would precipitate upon the addition of the silver salt solution. To simplify the etching step, therefore, it is preferred that the acid and its concentration be selected so that etching may be easily effected at ambient temperatures and at duration times of less than 10 minutes. As a rule of thumb, it can then be said that at ambient temperatures and durations of less than 10 minutes, acid concentrations providing a pH of from 0 to 3 should be sufficient to dissolve at least one percent of the nickel powder.

After the nickel powder is sufficiently etched, a silver salt solution is added to the mixture of etch acid and powder. In a very rapid replacement reaction, the silver ions are deposited onto the surface of the powder particles as elemental silver, as surface nickel atoms are ionized and go into solution. Even at ambient temperatures, the reaction is usually complete after a period of from 15 to 60 seconds. Since the reaction is an ion replacement reaction, one mole of nickel reduces two moles of silver. Although any soluble silver salt may be used, silver nitrate is most ideal because of its availability and extreme solubility.

The concentration of the silver salt solution is not critical. In fact, silver salt crystals could be added to the etch acid solution and there dissolved to precipitate metallic silver on the powder with equally satisfactory results. However, the reaction by this technique proceeds more slowly as the silver salt crystals must first be dissolved before all the silver can be deposited. The silver salt solution or the silver salt crystals, as the case may be, should be at a quantity and concentration sufficient to provide at least about one mole of silver for every 50 moles of etched powder, so that the coated powder will comprise at least three weight percent silver. Although there is not critical maximum limit for the silver content, the coated powder's catalytic characteristics are usually optimized at silver contents of from 10 to 30 weight percent. Therefore, it can be said that to realize the benefits of this invention, the silver coating must comprise at least three weight percent of coated powder, although 10 to 30 weight percent is preferred. Powders with from 3 to 10 weight percent will give good voltage characteristics, but will have a more limited life. The use of more than 30 weight percent silver would not only be wasteful, in that more silver is used than necessary, but it may further result in a powder having poorer catalytic characteristics, and a residual amount of silver ions in the solution which cannot be deposited on the powder.

After the powder has been properly coated with silver, it should be washed with water to remove all traces of the acid and salt solution. We have preferred to continuously rinse the coated powder with water until the rinse water shows a neutral pH.

After washing, the coated powder may be dried and used as any other powdered silver catalyst. Some improvement in the catalytic characteristics can be achieved, however, if the coated powder is dried and then heat treated in a nonoxidizing atmosphere before use. The heat treatment is preferably effected at a temperature of from 250 to 500° C. for a period of at least five minutes. After heat treatment, the powder is cooled and may be used as any other powdered silver catalyst.

The following examples are presented to aid in a fuller understanding of this invention. These examples are presented only for purposes of illustration and should not be construed as limitations.

EXAMPLE I

A silver salt solution was prepared by dissolving 9.6 grams of silver nitrate (6.0 g. Ag.) in 400 milliliters of water. In a separate vessel, 20 grams of carbonyl nickel powder (particle size 3-5 microns, surface area 0.5 m.$^2$/gm.) were added to one liter of 10 percent sulfuric acid solution at 50° C. and stirred for five minutes. After five minutes, the silver salt solution was added to the nickel suspension while stirring continued. The deposition of silver appeared to be complete in about 30 seconds. The solutions were then decanted from the powder, and the powder rinsed with water until the rinse water was neutral. The product powder was then filtered and dried at 105° C. in air, and then heat treated for one hour at 300° C. in a helium atmosphere. The product was then cooled and subsequent examination showed it to weigh 24 grams and comprise 25 percent silver and 75 percent nickel. This powder was subsequently compacted into an electrode. A fuel cell was constructed using this electrode as the cathode and using an anode catalyzed with platinum and palladium (each 20 mg./in.$^2$) with a 30 percent KOH electrolyte in a 30 mil asbestos matrix. The cell was operated on $H_2$ and $O_2$ at 18 p.s.i.g. and at 90° C. At 100 a.s.f. and 320 a.s.f., the resistance free voltage of the cell was measured at 995 and 910 millivolts, respectively This is comparable to cells having a cathode of pure high surface area silver catalyst.

EXAMPLE II

Fifteen grams of silver cyanide and 15 grams of potassium cyanide were dissolved in 250 milliliters of water.

Forty grams of nickel powder, having a particle size of 4–7 microns and a surface area of about 0.2 m.²/gm., were stirred for five minutes in one liter of 10 percent phosphoric acid at 30° C. After five minutes, the silver cyanide solution was added to the nickel-acid mixture as stirring continued for one minute. The solutions were then decanted from the powder, and the powder rinsed and dried and heat treated as in Example I. The dried powder was then fabricated into an electrode and tested under conditions identical to those of Example I. At 100 a.s.f. and 320 a.s.f., the resistance free voltage was measured at 980 and 880 millivolts, respectively.

EXAMPLE III

A production and testing procedure identical to that of Examples I and II was followed using 40 grams of Raney nickel (particle size less than 2.6 microns and surface area about 40 m.²/gm.) stirred for three minutes in one liter of 10 percent acetic acid at 25° C., and using a silver salt solution comprising 19 grams of silver nitrate dissolved in 200 milliliters of water. At 100 a.s.f. and 320 a.s.f., the resistance free voltage was measured at 995 and 870 millivolts, respectively.

EXAMPLE IV

The same production and testing procedure as in the previous examples was followed using 40 grams of nickel powder (particle size 3–5 microns, surface area 0.5 m.²/gm.) in one liter of five percent nitric acid at 60° C. and stirred for one minute; and using a silver salt solution comprising 19.5 grams of silver acetate dissolved in 250 milliliters of five percent nitric acid. At 100 a.s.f. and 320 a.s.f., the resistance free voltage was measured at 960 and 885 millivolts, respectively.

The embodiments of the invention in which an exclusive property or privilege is claimed are defined as follows:

1. A method of producing a high surface area silver catalyst powder, the steps comprising admixing a conductive metallic powder less noble than silver with an acid solution in which silver ions can exist to etch the surface of the powder particles; the concentration and temperature of said acid solution and the etch duration being sufficient to dissolve all oxides and other surface impurities; thereatfer admixing a soluble silver salt with the powder-acid mixture causing silver to be deposited on the surface of the powder particles; the quantity of said silver salt being sufficient to provide at least about one mole of silver per 50 moles of etched powder; and washing the mixed solutions from the coated particles of powder.

2. A method according to claim 1 further comprising drying the washed coated powder, heat treating the dried powder at a temperature of from 250 to 500° C. in a nonoxidizing atmosphere for a period of at least five minutes, and cooling the heat treated powder.

3. A method according to claim 1 wherein said silver salt is admixed as an aqueous solution thereof.

4. A method according to claim 1 wherein the quantity of said silver salt is sufficient to provide a coated powder comprising from 10 to 30 weight percent silver.

5. A method according to claim 1 wherein said silver salt comprises silver nitrate.

6. A method according to claim 1 wherein said acid solution is at ambient temperatures and at a concentration sufficient to yield a pH of from 0 to 3.

7. A method according to claim 1 wherein said conductive metallic powder comprises nickel.

8. A method according to claim 7 wherein said nickel powder has a particle size of 3 to 5 microns and a surface area of about 0.5 m.²/gm.

References Cited

UNITED STATES PATENTS

| | | | |
|---|---|---|---|
| 2,849,408 | 8/1958 | Bente | 252—476 X |
| 3,202,488 | 8/1965 | Ehrreich et al. | |
| 3,260,576 | 7/1966 | Gruene et al. | 136—86 X |
| 3,282,737 | 11/1966 | Hintermann et al. | 136—120 |
| 2,750,346 | 6/1956 | Sherwood | 252—474 |

WINSTON A. DOUGLAS, Primary Examiner

M. J. ANDREWS, Assistant Examiner

U.S. Cl. X.R.

117—100, 130; 136—86, 120; 252—476